United States Patent
Roach

(10) Patent No.: US 6,243,085 B1
(45) Date of Patent: Jun. 5, 2001

(54) PERSPECTIVE SWITCHING IN AUDIOVISUAL WORKS

(76) Inventor: Richard Gregory Roach, 12840 SE. 3rd St., Bellevue, WA (US) 98005

(*) Notice: Subject to any disclaimer, the term of this patent is extended or adjusted under 35 U.S.C. 154(b) by 0 days.

(21) Appl. No.: 08/173,431

(22) Filed: Dec. 27, 1993

(51) Int. Cl.[7] .......................... G06F 15/00; H04N 5/445
(52) U.S. Cl. ...................... 345/302; 348/563; 348/16
(58) Field of Search ................................. 395/152–154; 348/10–12, 16, 563, 564, 569; 273/310, 311; 463/31

(56) References Cited

U.S. PATENT DOCUMENTS

| | | | |
|---|---|---|---|
| 4,264,925 | * 4/1981 | Freeman et al. | 348/11 |
| 4,305,131 | * 12/1981 | Best | 395/152 |
| 4,507,680 | * 3/1985 | Freeman | 348/10 |
| 4,573,072 | * 2/1986 | Freeman | 348/10 |
| 4,847,698 | * 7/1989 | Freeman | 348/13 |
| 4,876,657 | * 10/1989 | Saito et al. | 395/153 |
| 5,014,125 | * 5/1991 | Pocock et al. | 348/12 |
| 5,065,345 | * 11/1991 | Knowles et al. | 395/154 |
| 5,109,482 | * 4/1992 | Bohrman | 395/154 |

OTHER PUBLICATIONS

Hyperbole Studios Release, Jun. 3, 1992 "Interactive Movie Takes Top Honors . . . ".
Houston Chronicle, Oct. 5, 1992, pp. 1B and 4B, "Artist Bringing Unique Computized Novel to Market".
Seybold Publications, Nov. 2, 1992, v. 7, n. 3, "Seybold San Francisco '92—A Progress Report", (Seybold Report on Desktop Publishing).
QuickTime; Ken Doyle; copyright 1991.

\* cited by examiner

*Primary Examiner*—Heather R. Herndon
(74) *Attorney, Agent, or Firm*—Wendy K. Buskop; Buskop Law Group

(57) ABSTRACT

Described is a technique to produce a user interactive movie having the capability of switching perspectives at the option of the user. The movie is in the form of a computer memory means having certain information recorded thereon. The information includes a digital database and preferably sets of computer instructions. The digital database is divided into a first portion and a second portion. The first portion of the digital database contains a chain of events as perceived from a first viewpoint and the second portion of the digital database contains the chain of events as perceived from a second viewpoint. The memory means preferably includes instructions for causing a computer to retrieve and output to a user through user interfaces the chain of events from either the first portion of the digital database or the second portion of the digital database, one at a time. Instructions for selectively causing the computer to switch from the retrieval and output of the chain of events of the first portion of the digital database to the retrieval and output of chain of events of the second portion of the digital database at any given point in the chain of events so as not to interrupt the continuity of the chain of events are also provided on the computer memory means. Also described are techniques for producing and playing the movie as well as a technique for using the invention with interactive and presently commercially available television.

5 Claims, 2 Drawing Sheets

PERSPECTIVE SWITCHING IN AUDIOVISUAL WORKS

BACKGROUND OF THE INVENTION

This invention relates to conveying information about events by use of a computer.

A story can be told from several different viewpoints. The different viewpoints can stem from physical differences associated with the viewer's perspective, such as differences in viewer location, lighting, and background noise levels. The differences can also stem from physical differences between different viewers, such as their visual or auditory acuity. The differences can also stem from psychological differences between different viewers, such as their attitudes toward the event or to other events which are distracting them or from cultural differences between different viewers, such as in their interpretation of certain gestures, facial expressions and word usage. The point is that different people will perceive the same event differently.

One of the shortcomings of traditional methods of storytelling is the incapability of the traditional methods to effectively switch perspectives to show a different viewpoint of the same event at the option of the recipient. There is simply no way to switch back and forth between story lines using traditional techniques other than by simultaneously displaying both story lines side by side. Also, little has been done to show how psychological or cultural differences affect a viewer's perceptions.

The conveying of information via computers is a new field. One of the ways in which this new field is different from old methods of conveying information, such as books, movies, television, and video and sound recordings, is in the ability of the user to interact with the information source. Also, accessing particular items of information is nearly instantaneous using the new technology.

A movie technique using a computer to switch perspectives between different viewpoints "on the fly" would be extremely powerful and effective.

OBJECTS OF THE INVENTION

It is an object of this invention to provide a method for producing a movie in which two or more parallel story lines are produced and stored for selective retrieval by the user without loss of continuity.

It is another object of this invention to provide a digital movie in which perspective switching between viewpoints can be carried out at the option of the viewer.

It is another object of this invention to provide a technique for telling a story using a computer to provide "on the fly" perspective switching between different viewpoints.

It is another object of this invention to convey information about an event to a user from different perspectives.

SUMMARY OF THE INVENTION

In one embodiment of the invention, there is provided a method of producing a user interactive movie. A story is recorded from a first perspective into a first portion of a digital database capable of recording information representing visual images. The story is formed by a sequence of timed events. The story is then recorded from a second perspective into a second portion of the digital database. The events of the story from the second perspective are timed to track the events from the first perspective. Instructions are recorded onto a digital database which can be the same as or different from the digital database containing the story for causing a computer to retrieve and output to a user through user interfaces the story from either the first perspective or the second perspective, one at a time. Instructions are also recorded onto a digital database which can be the same as or different from the database containing the story for selectively causing the computer to switch from the retrieval and output of the story from the first perspective to the retrieval and output of the story from the second perspective at any given point in the story without interruption of the continuity of story. The resultant movie has an almost limitless number of variations, depending on the user interactions.

In another embodiment of the invention, there is provided an article of manufacture comprising a computer memory means having certain information recorded thereon. The information includes a digital database. The digital database is divided into a first portion and a second portion. The first portion of the digital database contains a chain of events as perceived from a first viewpoint and the second portion of the digital database contains the chain of events as perceived from a second viewpoint. Preferably, the information represents motion pictures of the events as perceived from the first and second viewpoints and synchronization information so that the events in the two database portions can be coordinated with each other.

Preferably, the memory means includes instructions for causing a computer to retrieve and output to a user through user interfaces the chain of events from either the first portion of the digital database or the second portion of the digital database, one at a time as well as instructions for selectively causing the computer to switch from the retrieval and output of the chain of events of the first portion of the digital database to the retrieval and output of the chain of events of the second portion of the digital database at any given point in the chain of events while maintaining continuity of the chain of events. The resultant product constitutes an interactive movie with "on the fly" perspective switching in a single convenient package.

In another embodiment of the invention, there is provided a method for a computer user to receive more than one set of information about a series of events constituting a story. The user does this by using the user interfaces of the computer. The computer must be provided with the required user interfaces and access to the appropriate sets of instructions and to at least one digital database which contains the story information concerning the chain of events. The chain of events as perceived from a first viewpoint is stored as a first information set in a first portion of the digital database. The same chain of events as perceived from a second viewpoint is stored as a second information set in a second portion of the digital database. A first set of instructions is provided for causing the computer to retrieve and output to the user through the user interfaces the chain of events from either the first portion of the digital database or the second portion of the digital database, one at a time, as selected by the user. A second set of instructions is provided for selectively causing the computer to switch from the retrieval and output of the chain of events of the first portion of the digital database to the retrieval and output of chain of events from the second portion of the digital database at any given point in the chain of events so as not to interrupt the continuity of the chain of events, again, at the selection of the user. The user receives the information by causing the computer to retrieve and output to the user through the user interfaces the chain of events from the first portion of the digital database, and, as desired, causing the computer to switch to the retrieval and output through the user interfaces the chain of events from the second portion of the digital database. The user, in effect, becomes the editor of the movie by a repeatable, non-destructive technique. The result may be impermanent or retained for playback.

Another embodiment of the invention provides a method for making available to a user of a television set visual images taken from different viewpoints about a chain of events. The television set is operably associated with a switching box. The switching box is operably associated with a database source for transmitting data representing visual images to the switching box. The data is in the form of a first database portion containing data representing visual images of the series of events as perceived from a first viewpoint and a second database portion containing data representing visual images of the series of events as perceived from a second viewpoint. The switching box is provided with instructions for causing the switching box to output through the television set the visual images of the series of events from either the first database portion or the second database portion, one at a time. The switching box is also provided with instructions for selectively causing said switching box, responsively to input from the user, to switch from the outputting of the visual images of the chain of events of the first database portion to outputting of the visual images of the series of events of the second database portion at any given point in the chain of events while maintaining the continuity of the series of events. The method is carried out by transmitting the first database portion and the second database portion to the switching box so that the images can be retrieved at the option of the user. This embodiment of the invention makes it possible for cable television companies to provide user interactive movies in a cost effective manner.

In another embodiment of the invention there is provided a method for making available to a user information about a series of events as perceived from different viewpoints. This embodiment of the invention is carried out by using a television set having a reception means for receiving at least a first stream of data representing the series of events as perceived from a first viewpoint and a second stream of data representing the series of events as perceived from a second viewpoint. The television set, of course, is capable of transmitting the data in visual form to the user, one stream at a time and has a means for switching the reception means from the first stream to the second stream. In this embodiment of the invention, the method is carried out by simultaneously transmitting the streams of data to the reception means of the television set. The transmission of the data carried by the first stream is coordinated with the transmission of the data carried by the second stream so that the continuity of the chain of events as transmitted in visual form to the user is maintained when the reception means is switched from the first stream to the second stream. In a preferred mode of carrying out this embodiment of the invention, the first stream of data can be carried on a first channel, and the second stream of data can be carried on a second channel which is adjacent to the first channel. The user can receive the information from different perspectives simply by switching up one or down one channel.

BRIEF DESCRIPTION OF THE DRAWINGS

The FIG. 1 schematically illustrates a playback system including a computer, certain peripherals, and user interfaces for carrying out certain embodiments of the present invention.

DETAILED DESCRIPTION OF THE PREFERRED EMBODIMENTS

Figure 1:
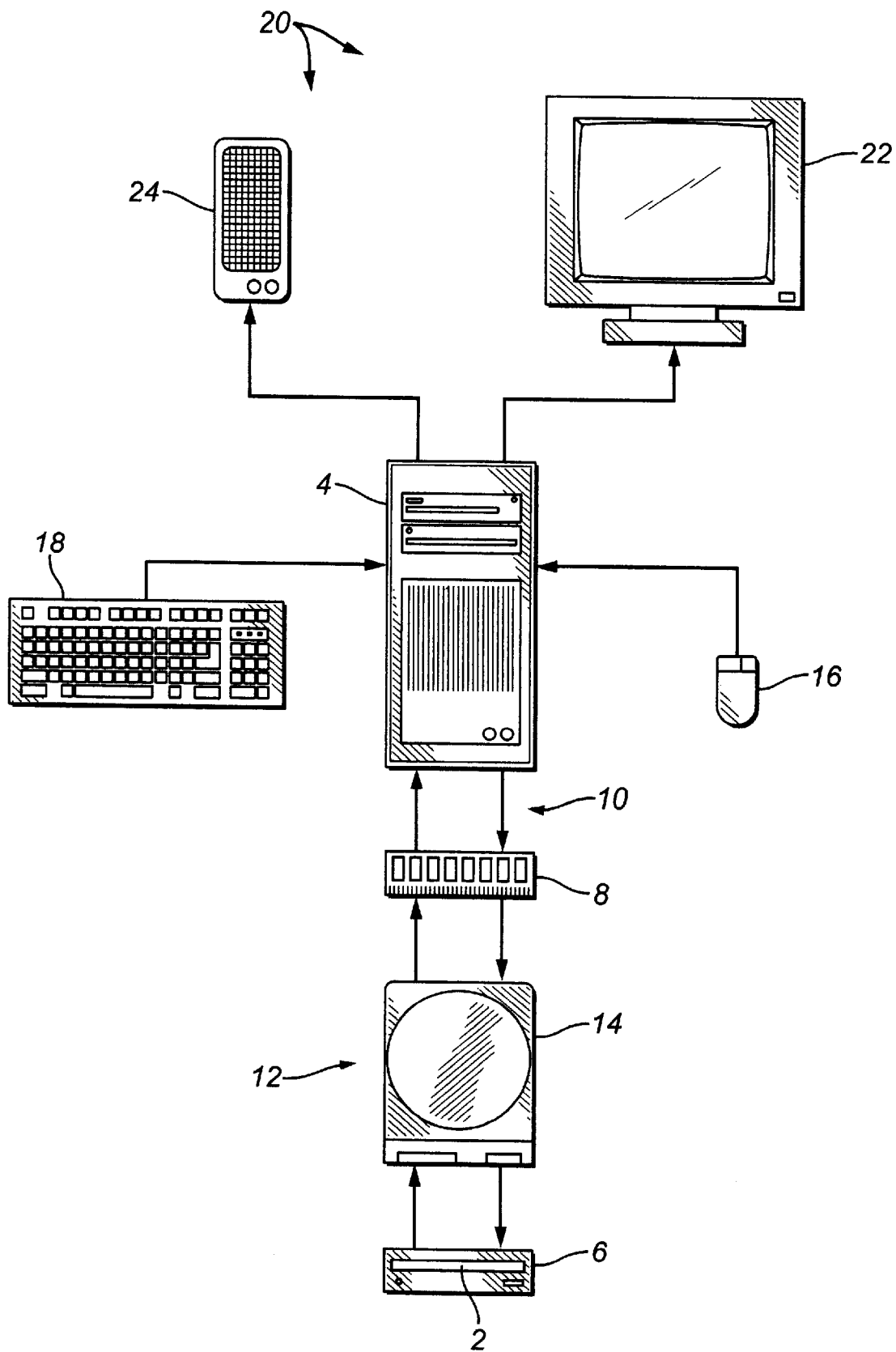
Figure 2:
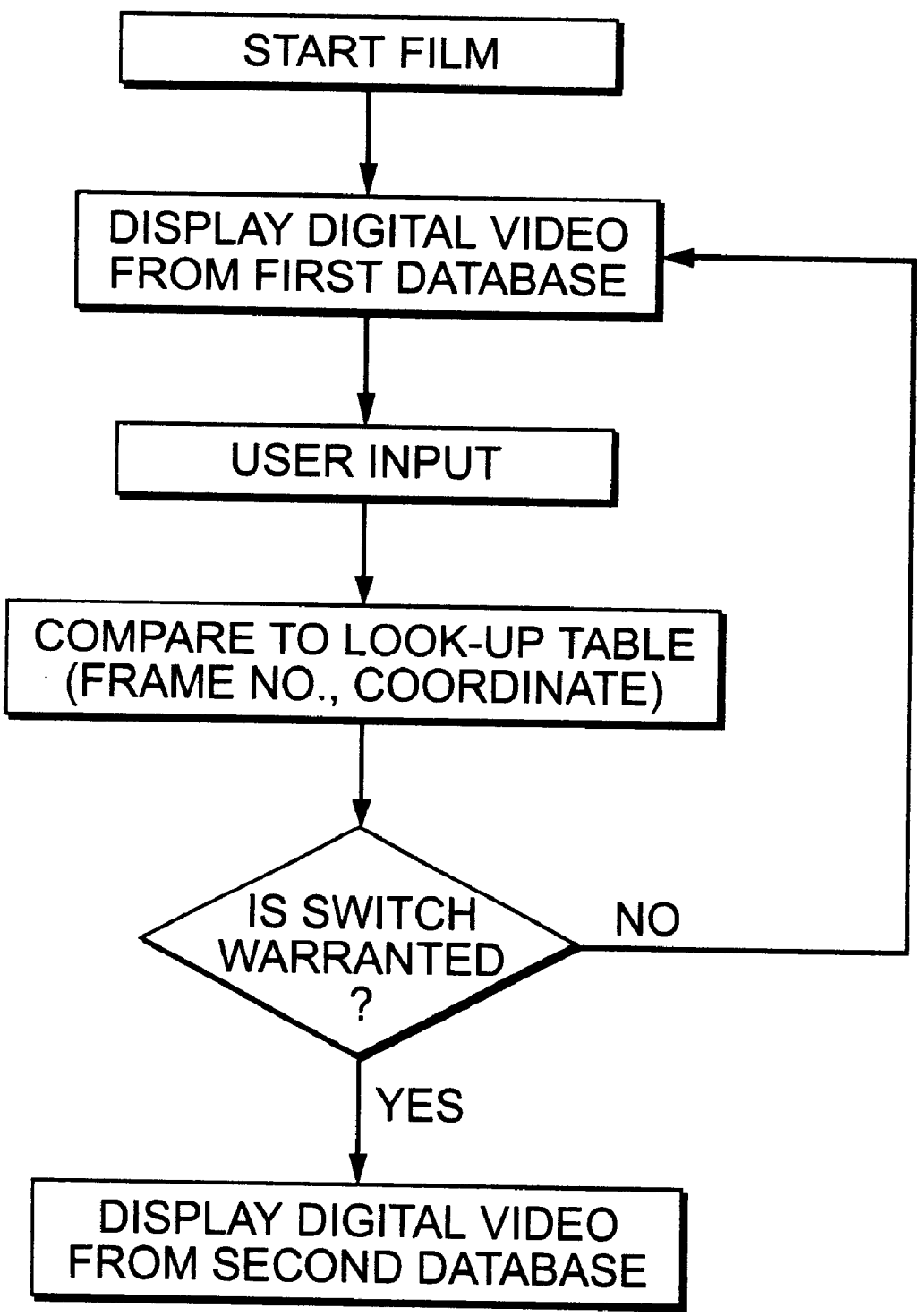
FIG. 2 illustrates the flowchart representing the information and control flow of the invention.

The method of producing the interactive movie is generally carried out as follows. A story is recorded from a first perspective into a first portion of a digital database capable of recording information representing visual images. The story is formed by a sequence of timed events. The story is then recorded from a second perspective into a second portion of the digital database. The events of the story from the second perspective are timed to track the events from the first perspective. Instructions are recorded onto a digital database for causing a computer to retrieve and output to a user through user interfaces the story from either the first perspective or the second perspective, one at a time, as well as instructions for selectively causing the computer to switch from the retrieval and output of the story from the first perspective to the retrieval and output of the story from the second perspective at any given point in the story without interruption of the continuity of the story. The instructions can be on a different storage medium than the story database, but preferably are on the same storage medium, for ease of subsequent use.

Generally speaking, the process of creating an interactive film begins identically to that of traditional cinema with the writing of a script. The script for an interactive film of this nature will be largely identical to a linear script.

Once the master of each shot has been filmed the director will communicate to the actors, cinematographer, costumer and other craftsmen how each shot or scene is to be reinterpreted through the perceptions of each character. These re-interpretations are then implemented and recorded.

After all the footage is digitized into the computer's memory (using, potentially, any number of existing technologies for the creation of digital video) the editor/programmer will, using a tool designed for this purpose, go through all the footage—creating a "look-up" table of time segments and screen locations. This information will be used by the programmer to cross reference all the film's "tracks" (taking into account the beginning and ending times of each shot as well as the location of each character on the screen) and program the final controlling shell which processes the user's decisions and displays the appropriate piece of footage.

The resulting movie can, but is not necessarily, contained in a single article of manufacture. Preferably, the movie is in the form of a single article of manufacture comprising a computer memory means having certain information recorded thereon. The information should be in a form so that it can be retrieved and downloaded into a random access computer memory. Preferably, the computer memory means is a read-only memory. Still better, the computer memory means is a read-only memory stored on a compact disk. In a preferred embodiment, the information on the compact disk includes a digital database and sets of computer instructions, although, as mentioned above, the instructions can be separate, such as resident on a computer hard drive. The digital database is divided into a first portion and a second portion. The first portion of the digital database contains a chain of events as perceived from a first viewpoint and the second portion of the digital database contains the chain of events as perceived from a second viewpoint. The memory means can include instructions for causing a computer to retrieve and output to a user through user interfaces the chain of events from either the first portion of the digital database or the second portion of the digital database, one at a time. Instructions for selectively causing the computer to switch from the retrieval and output of the chain of events of the first portion of the digital database to the retrieval and output of chain of events of the second portion of the digital database at any given point in the chain of events so as not to interrupt the continuity of the chain of events can also be provided on the computer memory means.

The Figure illustrates a playback system which can be used to practice certain embodiments of the invention. With reference to the Figure, the compact disk 2 is used in conjunction with a computer 4 which can be employed with the illustrated peripherals. The compact disk is contained in a compact disk reader 6 capable of reading the compact disk. The computer 4 is operably associated with a random access computer memory means 8. A means 10 electronically connects the computer 4 to the random access computer memory means 8. A means 12 electronically connects the compact disk reader to the random access computer memory means 8. The computer 4 is provided with suitable instruction means to cause the computer to transfer the digital database from the compact disk to the random access computer memory means.

The means 12 for electronically connecting the compact disk reader to the random access computer memory means preferably includes a hard drive 14. The instruction means to cause the computer to transfer the digital database from the compact disk to the random access computer memory means preferably includes instruction means to cause the digital database to be transferred from the compact disk to the hard drive and instruction means to cause the digital database to be transferred from the hard drive to the random access computer memory means.

The playback system also includes various user interfaces 16, 18, 22 and 24 which can be categorized as input devices and output devices. At least one input device is electronically coupled to the computer for inputting instructions from a user to the computer to cause the computer to execute the first and second instruction means. At least one output device is electronically coupled to the computer for outputting the information received from the digital database. Preferably, the input device comprises a mouse 16 and a keyboard 18. The playback system also includes at least one output device means 20 electronically coupled to the computer for outputting audio and visual information from the computer to the user. In the illustrated embodiment, the output device means 20 comprises a cathode ray tube screen 22 and audio synthesizer 24.

The interactive movie can be used to enable a computer user to receive more than one set of information about a series of events constituting a story. The user does this by using the user interfaces of the computer. The computer must be provided with the required user interfaces and access to the appropriate sets of instructions and to at least one digital database which contains the story information concerning the chain of events. Preferably, this is accomplished by loading the interactive movie of the invention and the computer instructions into the playback system. The chain of events as perceived from a first viewpoint is stored as a first information set in a first portion of the digital database. The same chain of events as perceived from a second viewpoint is stored as a second information set in a second portion of the digital database. A first set of instructions is provided for causing the computer to retrieve and output to the user through the user interfaces the chain of events from either the first portion of the digital database or the second portion of the digital database, one at a time, as selected by the user. A second set of instructions is provided for selectively causing the computer to switch from the retrieval and output of the chain of events of the first portion of the digital database to the retrieval and output of chain of events from the second portion of the digital database at any given point in the chain of events so as not to interrupt the continuity of the chain of events, again, at the selection of the user. The instructions can be downloaded to the hard drive from the digital database or from other sources. The user receives the information by causing the computer to retrieve and output to the user through the user interfaces the chain of events from the first portion of the digital database, and, as desired, causing the computer to switch to the retrieval and output through the user interfaces the chain of events from the second portion of the digital database.

In a preferred embodiment of the invention, the user interfaces include a screen operably associated with the digital database. The chain of events retrieved from the digital database is visually displayed on the screen. A position on the screen is indicated by a position indicator. The position of the position indicator on the screen is correlated with instructions in the playback system to access either the first database portion or the second database portion. The instructions are carried out in response to an instruction from one of the input devices, at the option of the user. Most preferably, a mouse is used to indicate position and to launch the instructions.

Preferably, the chain of events displayed on the screen includes images of a first character and a second character. The first digital database portion contains the chain of events as perceived by the first character. The second digital database portion contains the chain of events as perceived by the second character. To change perspectives, the user positions the position indicator on the character whose perspective is desired and inputs the instruction for causing the computer to switch perspectives. The computer retrieves and plays back through the user interfaces the perspectives of the character indicated by the position indicator from the appropriate database portion.

Another preferred embodiment of the invention involves the use of a television network as the database source for delivery of the database portions. Preferably, the network is a cable television network. The network interfaces with the user's television set through an intelligent cable switching box. A control program would be loaded onto the intelligent cable switching box. Loading could be accomplished either by transmitting the control program from the cable television company, or by loading or downloading of the program by the manufacturer of the switching box or by the user of the switching box. The switching box could be coupled with a digital database storage device for temporarily storing the database portions transmitted by the television network The storage device is required for best results if the data representing the same events in the two database portions aren't transmitted substantially simultaneously to the switching box. In this context, substantially simultaneously means, say, within about 100 milliseconds of the same time. Preferably, the first database portion and the second database portion are digitized and their transmission is coordinated so that the data representing the same event in the two database portions are transmitted at about the same time.

The control program preferably provides instructions for causing the switching box to output to the television set the chain of events from either the first digital database portion or the second digital database portion, either from the cable or from the storage device, depending on setup, and instructions for selectively causing the switching box, upon input from the user, to switch from the output of the chain of events of the first database portion to the retrieval and output of chain of events of the second database portion at any given point in the chain of events while maintaining the continuity of the chain of events. The control program would receive the user's input—making sense of user's choices (based on frame number and screen location) and switching between each of the available perspective streams which would all be continually "broadcast" in the sense of being available for reception by the user. Only the appropriate stream would be displayed at any given time, based on the user's actions. The actions can be directed through a position indicator for indicating a position on the screen.

The switching box can be provided with a means for correlating the position of the position indicator on the screen with selection of either the first database portion or the second database portion and a means for switching from the first database portion to the second database portion responsively to the position of the position indicator.

Where the first digital database portion contains the chain of events as perceived by a first character and the second digital database portion contains the chain of events as perceived by a second character, the invention can be carried out much in the same way as with a computer. The position indicator can be positioned on a character and a switch means actuated to switch from the first database portion to the second database portion responsively to the position of the position indicator.

Another embodiment of the invention uses existing technology in a new way to provide a user with information from different viewpoints about a series of events. The television set used may be interactive only in the sense of having the capability of changing channels at the option of the user. The television set includes a means for receiving at least a first channel and a second channel. The receiving means could be integral with the television set or a cable box, for example. The channels are for receiving and transmitting information from/to a user, one channel at a time. The set is also provided with a means for switching from the first channel to the second channel. The method is carried out by simultaneously broadcasting the series of events from a first digital database portion containing the chain of events as perceived from a first viewpoint on the first channel and the series of events from a second digital database portion containing the chain of events as perceived from a second viewpoint on the second channel. The broadcast of the chain of events on the two channels is coordinated so that the continuity of the chain of events is maintained when the television is switched from the first channel to the second channel.

EXAMPLE

"The Wrong Side of Town", an original interactive film written, directed, and produced by hypermedia designer Greg Roach, won the Best Narrative category and Best Overall Movie at the QuickTimeFilm Festival in San Francisco in May, 1992.

Roach, publisher of HyperBole, a disk-based interactive art, literature and entertainment magazine, worked on the film for several months. It was produced entirely on an Apple Macintosh LC computer, using QuickTime (tm), Supermax Video Spigot, Adobe Premiere, and MacroMind Director. The intelligent shell that processed the users' interaction was scripted in HyperCard. The film was 100 MB in size. Footage was shot with a one chip video camera and a cordless microphone.

"The Wrong Side of Town" is a short (5 min) movie about a woman's encounter with a homeless person while on a business trip. When more than one character appears on the screen at once, the viewer simply points the mouse at the chosen actor, and clicks; the point of view immediately switches to reflect that character's perceptions.

The real surprise is that the movie continues forward in real time. When you click on another person, the flow of the film switches. The interface is interesting because in the movie itself—there aren't any buttons or text—none of the usual trappings associated with interactive multimedia. In some ways the viewer becomes a part of the filmmaking process—they decide how the film is edited, but they're not forced to interact. You could watch the film completely passively and still get a full, cogent story.

"The Wrong Side of Town" was screened at AFI's anniversary celebration, Jun. 22, 1992. It was on display at Digital World at the Beverly Hilton, Jun. 23–25, 1992.

What is claimed is:

1. A method for making available to a user of a television set visual images taken from a first perspective and a second perspective of a series of events, said series of events having a sequence, said television set being in operable association with a switching box, said switching box being in operable association, via a digital database storage device, with a television network for transmitting
  a first database portion containing data representing visual images of the series of events from the first perspective and
  a second database portion containing data representing visual images of the series of events from the second perspective;

said digital database storage device being for temporarily storing the database portions transmitted by the television network, said switching box being provided with instructions for causing said switching box to output through the television set visual images of the series of events from either the first database portion or the second database portion; and
  instructions for selectively causing said switching box, responsively to input from the user, to switch from the outputting of the visual images of the series of events of the first database portion to outputting of the visual images of the series of events of the second database portion at any selected event in the series of events without interruption of the sequence of the events;

said method comprising transmitting the first database portion and the second database portion to the digital database storage device.

2. A method as in claim 1 further comprising transmitting the instructions to the switching box.

3. A method as in claim 1 wherein the first database portion and the second database portion are in digital form, said method further comprising transmitting the first database portion and the second database portion so that each event in the series of events is transmitted substantially simultaneously in said first database portion and said second database portion.

4. A method as in claim 3 wherein the television set comprises a screen, said screen being operably associated with a position indicator for indicating a position on the screen, said method further comprising outputting the visual images from the first database portion to the screen;

indicating a position on the screen with the position indicator;

correlating the position of the position indicator on the screen with selection of the second database portion; and switching from outputting the first database portion to outputting the second database portion responsively to the position of the position indicator.

5. A method as in claim 4 wherein the first digital database portion contains data representing visual images of the series of events as perceived by a first character and the second digital database portion contains data representing visual images of the series of events as perceived by a second character; said method further comprising:

positioning the position indicator on the second character and switching from outputting the first database portion to outputting the second database portion.

* * * * *